US009235257B2

(12) United States Patent
Richardson

(10) Patent No.: US 9,235,257 B2
(45) Date of Patent: Jan. 12, 2016

(54) APPARATUS, SYSTEMS AND METHODS FOR MODIFYING OPERATING STATES BASED ON MONITORED HDMI CEC COMMUNICATIONS

(71) Applicant: EchoStar Technologies L.L.C., Englewood, CO (US)

(72) Inventor: Jon Richardson, Chamblee, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 464 days.

(21) Appl. No.: 13/707,191

(22) Filed: Dec. 6, 2012

(65) Prior Publication Data
US 2013/0159753 A1   Jun. 20, 2013

Related U.S. Application Data

(60) Provisional application No. 61/570,457, filed on Dec. 14, 2011.

(51) Int. Cl.
*G06F 1/32* (2006.01)
*H04N 21/436* (2011.01)
(Continued)

(52) U.S. Cl.
CPC ............... *G06F 1/325* (2013.01); *G06F 1/3209* (2013.01); *G06F 13/4068* (2013.01); *H04N 21/43635* (2013.01); *H04N 21/442* (2013.01)

(58) Field of Classification Search
CPC .................. H04N 21/43635; H04N 21/43615; H04N 21/4436; G09G 2370/06; G06F 1/325; G06F 1/3203; G06F 1/3209; G06F 1/3215; G06F 11/3055
See application file for complete search history.

(56) References Cited

U.S. PATENT DOCUMENTS 8,954,768 B2 * 2/2015 Dickens et al. ............... 713/310
2003/0149492 A1   8/2003 Munezane
(Continued)

FOREIGN PATENT DOCUMENTS

EP    1376938 A1    1/2004
JP    2009016897 A  1/2009

OTHER PUBLICATIONS

Y.K. Jeong et al., A Network Level Power Management for Home Network Devices, IEEE Transactions on Consumer Electronics, May 1, 2008, pp. 487-493, vol. 54, No. 2, XP011229924, ISSN: 0098-3063, DOI:10.1109/TCE.2008.4560119, IEEE Service Center, New York, NY, U.S.

*Primary Examiner* — Kim Huynh
*Assistant Examiner* — Brandon Kinsey
(74) *Attorney, Agent, or Firm* — Lowe Graham Jones PLLC

(57) ABSTRACT

Systems and methods provide control of operating states of an electronic device. A first exemplary electronic device detects a consumer electronic control (CEC) communication sent from a second electronic device to a third electronic device, the CEC communication communicated over high-definition multimedia (HDMI) connectors communicatively coupling the first electronic device, the second electronic device and the third electronic device; determines, based on information in the CEC communication, whether the CEC communication is one of a first kind of CEC communication or a second kind of CEC communication; in response to determining that the CEC communication is one of the first kind of CEC communication, transitions the first electronic device to a predefined operating state; and in response to determining that the CEC communication is one of the second kind of CEC communication, maintains the first electronic device in a current operating state.

20 Claims, 3 Drawing Sheets

(51) Int. Cl.
*H04N 21/442* (2011.01)
*G06F 13/40* (2006.01)
*H04N 21/4363* (2011.01)

(56) References Cited

U.S. PATENT DOCUMENTS

| | | | |
|---|---|---|---|
| 2004/0032605 A1* | 2/2004 | Regimbal | 358/1.13 |
| 2006/0010331 A1 | 1/2006 | Ohara | |
| 2008/0270814 A1* | 10/2008 | Starr et al. | 713/323 |
| 2009/0046205 A1* | 2/2009 | Strasser et al. | 348/634 |
| 2009/0083560 A1* | 3/2009 | O'Connell et al. | 713/323 |
| 2009/0290065 A1* | 11/2009 | Asayama et al. | 348/553 |
| 2010/0033026 A1 | 2/2010 | Goto et al. | |
| 2010/0115318 A1* | 5/2010 | Suzuki et al. | 713/323 |
| 2010/0131782 A1* | 5/2010 | Higuchi | 713/310 |
| 2011/0047394 A1* | 2/2011 | Sato | 713/310 |

\* cited by examiner

APPARATUS, SYSTEMS AND METHODS FOR MODIFYING OPERATING STATES BASED ON MONITORED HDMI CEC COMMUNICATIONS

PRIORITY CLAIM

This application claims the benefit of and priority to U.S. provisional application entitled "APPARATUS, SYSTEMS AND METHODS FOR MODIFYING OPERATING STATES BASED ON MONITORED HDMI CEC COMMUNICATIONS," having application Ser. No. 61/570,457, filed Dec. 14, 2011, and which is incorporated herein by reference in its entirety.

BACKGROUND

Electronic devices, such as a set top box, a stereo, a television, a computer system, a game system, or the like, are often configured to enter into various operating states based on use. For example, an electronic device may enter into a deep sleep state to conserve power at times when it is not being used, or is not likely to be used. On the other hand, the electronic device may remain in an active state, or in standby state, if the electronic device has recently been used, or is likely to be used.

When the electronic device is in a deep sleep state, a period of time may be required for the electronic device to leave its deep sleep state and to "wake up" so as to be ready for operation. Typically, the electronic device leaves its deep sleep state upon receiving an initial command from a user and/or upon receiving information from another electronic device. However, the time required for the electronic device to transition out of its deep sleep state may require an unacceptably long duration, especially if the user or another electronic device needs to operate the electronic device in a relatively short period of time.

Accordingly, there is a need in the arts to provide alternative ways for a electronic device to transition out of its deep sleep state so as to be able to more quickly respond to an initial command from a user and/or to information received from another electronic device.

SUMMARY

Systems and methods are operable to provide control of operating states of an electronic device. An example embodiment detects a consumer electronic control (CEC) communication sent from a second electronic device to a third electronic device, the CEC communication communicated over high-definition multimedia (HDMI) connectors communicatively coupling the first electronic device, the second electronic device and the third electronic device; determines, based on information in the CEC communication, whether the CEC communication is one of a first kind of CEC communication or a second kind of CEC communication; in response to determining that the CEC communication is one of the first kind of CEC communication, transitions the first electronic device to a predefined operating state; and in response to determining that the CEC communication is one of the second kind of CEC communication, maintains the first electronic device in a current operating state.

BRIEF DESCRIPTION OF THE DRAWINGS

Preferred and alternative embodiments are described in detail below with reference to the following drawings.

DETAILED DESCRIPTION

Figure 1:
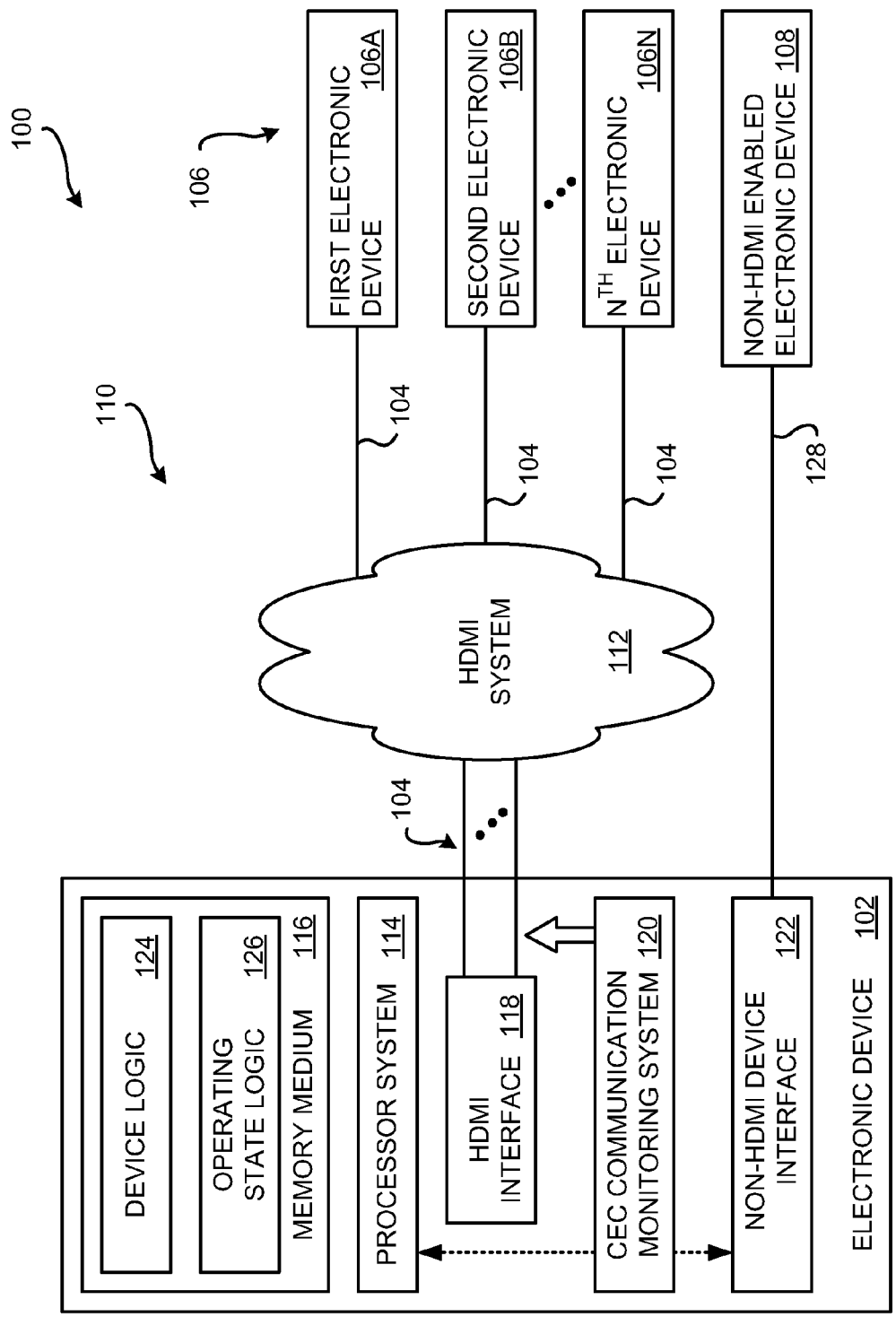
FIG. 1 is a block diagram of an embodiment of a consumer electronic control (CEC) communications monitoring system implemented in an example electronic device.

FIG. 1 is a block diagram of an embodiment of a consumer electronic control (CEC) communications monitoring system 100 implemented in an example electronic device 102. The example electronic device 102 is configured to receive communications via a high-definition multimedia (HDMI) connector 104. The HDMI connector 104 carries CEC communications that are communicated between other electronic devices 106 over an internal CEC bus, which is a wire (not shown) within the HDMI connector 104.

Exemplary embodiments of the electronic device 102 are configured to monitor CEC communications that are communicated over the CEC bus of the HDMI connector 104. Upon detection of certain kinds of CEC communications, the electronic device 102 transitions from a current operating state to a predefined operating state. For example, the electronic device 102 may transition from a deep sleep state to a standby state, or a state of higher readiness, upon detection of particular kinds of CEC communications that are detected on the HDMI connector 104. When other kinds of CEC communications are detected, the electronic device 102 remains or is maintained in its current operating state. Alternatively, or additionally, when some kinds of CEC communications are detected, the electronic device 102 may transition into a deep sleep state to another lower power standby state.

FIG. 1 conceptually illustrates the example electronic device 102, a plurality of other example electronic devices 106a-106n, and an example non-HDMI enabled electronic device 108, that are communicatively interconnected in an example operating environment 110. The example electronic devices 106a-106n are CEC enabled, and accordingly, are configured to monitor the CEC bus of their respective HDMI connector 104 for CEC communications having their unique identifiers that identify them as the destination electronic device. The electronic devices 106a-106n and the example electronic device 102 are communicatively coupled together via a HDMI system 112. Accordingly, the example electronic devices 106a-106n and the example electronic device 102 may exchange commands and/or information over the CEC bus of their respective HDMI connector 104. The example electronic devices 106a-106n and the example electronic device 102 may be physically coupled together in a serial configuration and/or a parallel configuration using one or more of the HDMI connectors 104.

CEC is a feature that allows a user or another device to command and control the CEC-enabled electronic devices 106a-106n that are interconnected through HDMI connectors 104. The HDMI-CEC bus is a one-wire interface that connects audiovisual devices through standard HDMI cabling. For example, a user may control any of the CEC-enabled electronic devices 106a-106n by using only one of their remote controls. The CEC bus is a one-wire bidirectional serial bus that uses the industry-standard audiovisual link protocol to perform various functions, such as, but not limited to, remote control functions. The HDMI-CEC protocol includes mechanisms for physical address discovery, logical addressing, arbitration, retransmission, broadcasting, and routing. Protocol operations support features that are device specific (i.e. DVD, Blu-ray, and TV) and generic (i.e. power, on-screen display, and remote control pass-through). An objective of the HDMI-CEC bus is to provide a high level of automatic control between HDMI-connected devices and their associated remote controls.

A CEC command includes several types of information, such as an originator address of the CEC-enabled electronic device 106 originating a CEC communication, the destination address of the CEC-enabled electronic device 106 that is intended to receive the CEC communication, end of message and acknowledgement flags, and data corresponding to the communicated information or function. The CEC-enabled electronic devices 106a-106n are discoverable by other CEC-enabled electronic devices. Accordingly, when the electronic device 102 is connected to the HDMI system 112, if CEC enabled, the electronic device 102 may discover the identity and operating characteristics of the various other CEC-enabled electronic devices 106a-106n that are connected to the HDMI system 112.

In the various embodiments, a communication issued or transmitted from a CEC-enabled electronic device is generically referred to herein as a CEC communication. Thus, any communication from a CEC-enabled electronic device may be monitored by the electronic device 102. In some instances, a CEC-enabled electronic device will respond to acknowledge receipt of a message, a ping, a query or the like communicated from another electronic device. In the various embodiments, the acknowledgement type communication issued or transmitted from CEC-enabled electronic device is generically referred to herein as a CEC communication. Accordingly, acknowledgement CEC communications from CEC-enabled electronic devices may be monitored by the electronic device 102.

The example electronic device 102 comprises a processor system 114, a memory medium 116, a HDMI interface 118, a CEC communication monitoring unit 120, and an optional non-HDMI device interface 122. The memory medium 116 comprises portions for storing the device logic 124 and the operating state logic 126. In some embodiments, the device logic 124 and the operating state logic 126 may be integrated together, and/or may be integrated with other logic. In other embodiments, some or all of these memory and other data manipulation functions may be provided by using a remote server or other electronic devices suitably connected via the Internet or otherwise to the electronic device 102. Other electronic device 102 embodiments may include some, or may omit some, of the above-described components. Further, additional components not described herein may be included in alternative embodiments.

The processes performed by the electronic device 102 relating to the operation of the electronic device 102 for its intended function are generally implemented by the processor system 114 while executing the device logic 124. The electronic device 102 performs a plurality of different operations relating to the intended purposes and/or functions of the electronic device 102.

The processes performed by the electronic device 102 relating to the various operating states of the electronic device 102 are generally implemented by the processor system 114 while executing the operating state logic 126. The electronic device 102 may be configured to have one or more operating states. An example operating state is a fully operational state (full power state or fully-on state), wherein most or all of the various components necessary for device operation are maintained in a fully powered and fully operational state so that the electronic device 102 may immediately respond to commands and/or perform operations as needed when operating for its intended purpose. That is, the electronic device 102 is in a fully operational state wherein the first electronic device is fully operational for its intended function.

Another operating state may be an alert state or other state of higher readiness (e.g., a standby state or quick start state) wherein some components are fully powered and ready for immediate operation, while other components are powered off and/or are at a low power level and are not ready for immediate operation. Here, the electronic device 102 is utilizing some level of standby power, which is electrical power used by the electronic device 102 while switched off or not performing its primary function. When these powered off or lower power level components are required to perform a function, such components can become fully powered and operational in a relatively short period of time. Continuous low power consumption when operating in the standby state or quick start state is needed for such electronic devices 102, such as security systems, fire alarms, and many digital video recorders on standby, to operate properly. In some electronic devices 102, the low power use may be initiated by timers to switch off devices or components of the electronic device 102 which would otherwise waste energy, thereby reducing total energy usage of the electronic device 102.

Yet another non-limiting example operating state may be a hard power down state (or deep sleep state) wherein one or more of the components are not powered and are not ready for immediate operation. Definitions and standards relating to this state, and other operating states, are described in the Advanced Configuration and Power Interface (ACPI) specification, revision 4.0a, which is incorporated herein by reference in its entirety. The ACPI provides an example, non-limiting open standard for device configuration and power management by the operating systems of an example electronic device 102. When the electronic device 102 is operating in the hard power down state, the powered down components require a relatively long period of time to become fully powered and operational. The operating state logic 126 is used to place the electronic device 102 into its various operating states and/or to transition the electronic device 102 between the various operating states.

The HDMI interface 118 is configured to physically couple to and communicatively couple with one or more HDMI connectors 104. When the one or more HDMI connectors 104 are communicatively coupled to the HDMI interface 118, the electronic device 102 may receive or transmit information and/or instructions to the other HDMI/CEC enabled devices that are coupled to their respective HDMI connector 104, such as the example CEC-enabled electronic devices 106a-106n. Information and/or commands received over the HDMI connector(s) 104 and/or over the CEC bus of the HDMI connector 104 are processed by the processor system 114.

The CEC communication monitoring unit 120 is configured to monitor CEC communications over the CEC bus of the HDMI connector(s) 104. Based on a current operating state of the electronic device 102, the CEC communication monitoring unit 120 may prompt or otherwise cause the processor system 114 to perform one or more actions in response to detecting certain kinds of CEC communications between the electronic devices 106a-106n. The actions may include, but are not limited to, changing the current operating state of the electronic device 102 to a different operating state when a first kind of CEC communication is detected, maintaining a current operating state when a second kind of CEC communication is detected, or even transitioning to a lower state of readiness.

For example, the electronic device 102 may be currently in a hard power down state of operation. Upon detecting a particular kind of communication over the CEC bus between the electronic devices 106a-106n, the CEC communication monitoring unit 120 may prompt or otherwise cause the processor system 114 to "wake up" so that the electronic device 102 may be transitioned to the alert state or the fully operational state. When other kinds of communications over the CEC bus are detected, the CEC communication monitoring unit 120 will not prompt or otherwise cause the processor system 114 to change the operating state of the electronic device 102. That is, the current operating state of the electronic device 102 is maintained.

Alternatively, the electronic device 102 may be currently in a full power state of operation. Upon detecting a particular kind of communication over the CEC bus between the electronic devices 106a-106n, the CEC communication monitoring unit 120 may prompt or otherwise cause the processor system 114 to "sleep" so that the electronic device 102 may be transitioned to the alert state or the deep sleep state. When other kinds of communications over the CEC bus are detected, the CEC communication monitoring unit 120 will not prompt or otherwise cause the processor system 114 to change the operating state of the electronic device 102. Other kinds of detected CEC communications may cause the electronic device 102 to remain in its full power state for some predefined duration. That is, the full power operating state of the electronic device 102 is maintained.

The types of CEC communications that are monitored are the kinds of CEC-based communications wherein the electronic device 102 itself is not a destination device that is intended to receive the CEC communication. For example, the example first electronic device 106a and the example second electronic device 106b may be exchanging CEC communications with each other via the CEC bus of their respective HDMI connectors 104. Although the electronic device 102 is not the intended recipient of such CEC communications, these CEC communications are detectable by the CEC communication monitoring unit 120 by monitoring the CEC bus.

In some situations, the electronic device 102 may be typically operated at the same time as the first electronic device 106a and/or the second electronic device 106b. For example, the electronic device 102 may be a digital video disc (DVD) player, the first electronic device 106a may be a set top box (STB), and the second electronic device 106b may be a television (TV). Initially, the DVD player 102 may be in a deep sleep state while the STB 106a and the TV 106b have been powered on and are in use to present media content to the user. In this situation, there is a probability that at some point, the user may wish to operate the DVD player 102 to watch media content stored on a DVD. When the STB 106a sends a CEC communication to the TV 106b to perform some specified operation, the presence of this kind of CEC communication (wherein the detected CEC communication is associated with a user command) tends to indicate active use of the STB 106a and the TV 106b. Accordingly, the CEC communication monitoring unit 120, upon detecting this type of CEC communication, may prompt or otherwise cause the processor system 114 to transition the DVD player 102 from its current deep sleep state to a standby state so that if the user wishes to operate the DVD player 102 in this example, the DVD player 102 may quickly become powered and operational at the time that the user wishes to operate the DVD player 102. Upon detecting other types of CEC communications, the electronic device 102 may prompt or otherwise cause the processor system 114 to transition the DVD player 102 to a full power state.

In other situations, the STB 106a may be providing automated routine maintenance type commands and/or routine information to the TV 106b (that are not associated with user commands and/or are associated with non-user type commands). Such types of CEC communications would typically not be associated with the presence of a user who might wish to operate the DVD player 102. That is, there is a relatively low probability that at some point, the user may wish to operate the DVD player 102. Accordingly, the CEC communication monitoring unit 120, upon detecting this other type of CEC communication, would not prompt or otherwise cause the processor system 114 to transition the DVD player 102 from its current deep sleep state to a standby state.

In some embodiments, the electronic device 102 may be communicatively coupled to a non-HDMI enabled electronic device 108. In the example embodiment illustrated in FIG. 1, the electronic device 102 is illustrated as being communicatively coupled to the non-HDMI enabled electronic device 108 via a wire-based connector 128. Alternatively, the electronic device 102 may be configured to wirelessly communicate with the non-HDMI enabled electronic device 108 using an infrared (IR) or radio frequency (RF) medium.

In some situations, the non-HDMI enabled electronic device 108 may be typically operated at the same time as one or more of the electronic devices 106a-106n and/or the electronic device 102. However, since the non-HDMI enabled electronic device 108 is not configured to couple to other electronic devices using a HDMI connector 104, the non-HDMI enabled electronic device 108 will not be able to detect CEC type communications. Accordingly, the CEC communication monitoring unit 120, upon detecting some kinds of CEC communications, may prompt or otherwise cause the non-HDMI enabled electronic device 108 to transition the electronic device 102 from the a first operating state to a second operating state. For example, the electronic device 102 may send a command that causes the non-HDMI enabled electronic device 108 to transition to a standby state so that if the user wishes to operate the non-HDMI enabled electronic device 108, the non-HDMI enabled electronic device 108 can become fully powered and operational in a relatively short period of time.

Figure 2:
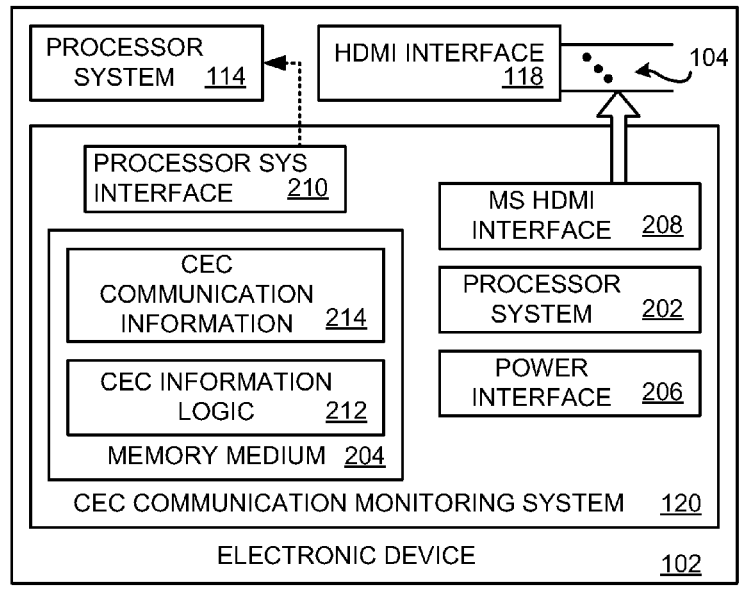
FIG. 2 is a block diagram of an embodiment of a CEC communications monitoring unit implemented in an example electronic device.

FIG. 2 is a block diagram of an embodiment of a CEC communications monitoring unit 120 implemented in an example electronic device 102. The example CEC communications monitoring unit 120 comprises processor system 202, a memory medium 204, a power interface 206, a monitoring system (MS) HDMI interface 208, and an optional processor system interface 210. The memory medium 204 comprises portions for storing the CEC information logic 212 and the CEC communication information 214. In some embodiments, the CEC information logic 212 and the CEC communication information 214 may be integrated together, and/or may be integrated with other logic or information. Other CEC communications monitoring unit 120 embodiments may include some, or may omit some, of the above-described components. Further, additional components not described herein may be included in alternative embodiments.

The example CEC communications monitoring unit 120 embodiment is a relatively small sized and low power standalone device that receives a relatively small amount of power via the power interface 206 that is needed for its operation. Accordingly, other components of the electronic device 102 may be powered down so that the example electronic device 102 may enter into a reduced power state, such as, but not limited to, a deep sleep state, a standby state, or the like. In some embodiments, the power interface 206 includes a power source, such as a battery, capacitor, or other store of power so that the power supply (not shown) of the installation electronic device 102 may be shut down.

The MS HDMI interface 208 is configured to monitor CEC communications that are being communicated via one or more of the HDMI connectors 104 that are coupled to the HDMI interface 118. In an example embodiment, a connector, a HDMI connector splitter, or the like (not shown) is coupled to the CEC bus of at least one HDMI connector 104. Alternatively, a connector (not shown) may be coupled to the internal CEC bus of the HDMI interface 118 or to another available bus or the like internal to the electronic device 102. Alternatively, the HDMI connector 104 may be configured to receive and couple to its own HDMI connector 104.

CEC communications detected at the MS HDMI interface 208 are received and processed by the processor system 202 executing the CEC information logic 212. Based on certain kinds of detected CEC communications, the processor system 202 of the CEC communications monitoring unit 120 may generate information, such as an instruction, a command, a signal, or the like, that causes the processor system 114 of the electronic device 102 to transition from a first operating state to second operating state. When other kinds of CEC communications are detected, the processor system 202 refrains from communicating the information to the processor system 114 so that the current operating state is maintained by the processor system 114.

In an example embodiment, the generated information is communicated from the CEC communications monitoring unit 120 to the processor system 114 of the electronic device 102 via the MS HDMI interface 208. Here, the generated information may be formatted as a CEC-type command that is communicated onto the CEC bus of the HDMI connector(s) 104, the HDMI interface 118, or an internal CEC bus. Alternatively, the generated information is not in the CEC format, but is receivable by the processor system 114 of the electronic device 102 via a CEC bus. For example, a non-CEC format message may be communicated onto the CEC bus that is only recognizable to the processor system 114 of the electronic device 102, and is not recognizable by the other CEC-enabled electronic devices 106a-106n that may detect the non-CEC type communication.

In an alternative example embodiment, processor system 202 of the CEC communications monitoring unit 120 communicates the generated information over another link to the processor system 114 of the electronic device 102. For example, the processing system interface 210 may be communicatively coupled to the processor system 114 of the electronic device 102 using an available internal connector or bus. Or, the processor system interface 210 may be directly coupled to the processor system 114 via a dedicated connector or bus.

In embodiments where the non-HDMI enabled electronic device 108 is provided information to cause a transition of its operating state, the generated information may be sent to the processor system 114 of the electronic device 102. If the electronic device 102 is in a deep sleep state or standby state, once components of the electronic device 102 that are associated with communications with the non-HDMI enabled electronic device 108 are operational, then the generated information may be communicated from the electronic device 102 to the non-HDMI enabled electronic device 108 via the non-HDMI interface 122. If the electronic device 102 is already in a full power state, the generated information may be immediately communicated to the non-HDMI enabled electronic device 108. Alternatively, the CEC communications monitoring unit 120 may include an interface (not shown) or connection (not shown) to the non-HDMI interface 122 so that the generated information can be communicated directly to the non-HDMI enabled electronic device 108 from the CEC communications monitoring unit 120.

In alternative embodiments, the CEC communications monitoring unit 120 is implemented as firmware, or as a combination of firmware and software. In other alternative embodiments, the CEC communications monitoring unit 120 is implemented as logic and stored in the memory medium 116 for execution by the processor system 114 of the electronic device 102. In such embodiments, the processor system 114 and the memory medium remain powered and operational in the various operating states.

In some embodiments, the CEC communications monitoring unit 120 is an external device that is communicatively coupled to the electronic device 102. For example, the external CEC communications monitoring unit 120 may be coupled to its own HDMI connector 104. The external CEC communications monitoring unit 120, in this example embodiment, has stored the unique identifier of the electronic device 102. CEC communications on the CEC bus can be monitored for communications occurring between the CEC-enabled electronic devices 106a-106n. If a change in the operating state of the electronic device 102 is warranted, then information may be generated by the external CEC communications monitoring unit 120 and may then be communicated to the electronic device 102. The generated information may be communicated from the external CEC communications monitoring unit 120 to the electronic device 102 over the CEC bus of the HDMI connectors 104, may be directly communicated from the CEC communications monitoring unit 120 to the electronic device 102 using a wire-based medium, or may be directly communicated from the CEC communications monitoring unit 120 to the electronic device 102 using wireless medium, such as an IR or RF signal. Some embodiments may employ an IR blaster device or system therein or coupled thereto.

The CEC communication information 214 comprises information that is used to assess the nature of detected CEC communications, to identify the originating and/or destination CEC-enabled electronic devices 106a-106n, and to determine an action that is to be taken by the electronic device 102. In some embodiments, the CEC communication information 214 may have information stored using a table format or another suitable relational database. The CEC communication information 214 may be stored in the memory medium 204. Alternatively, the CEC communication information 214 may be stored in the memory medium 116 or in another accessible memory medium.

Figure 3:
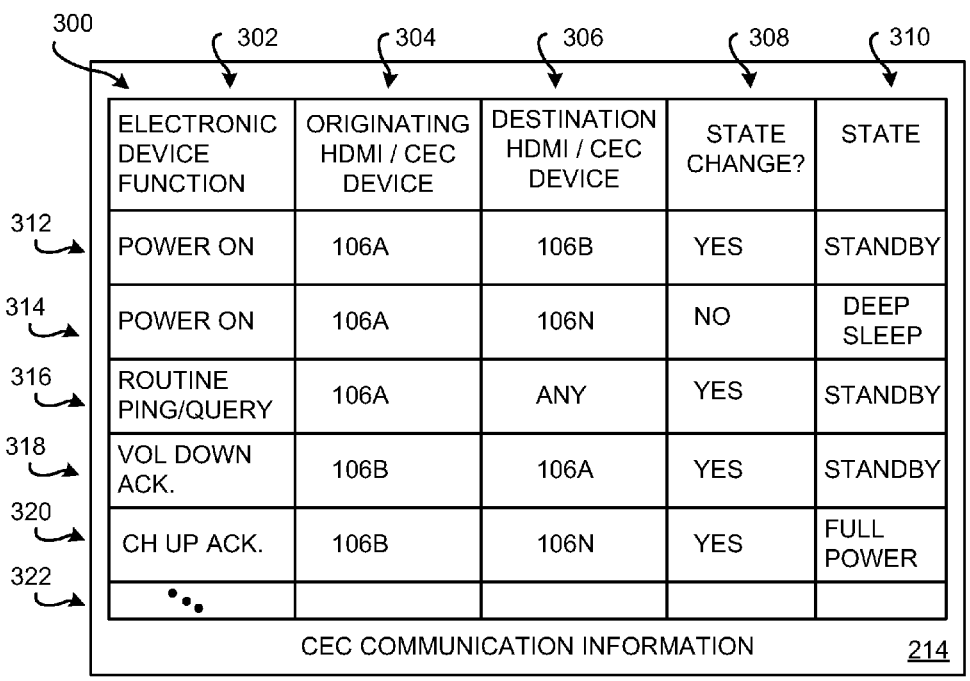
FIG. 3 illustrates an example embodiment of the CEC communication information 214 stored in a table.

FIG. 3 illustrates an example embodiment of the CEC communication information 214 stored in a non-limiting example table 300. The example table 300 is conceptually illustrated as residing in the memory medium 204 of the CEC communications monitoring unit 120 to facilitate description of a possible embodiment of the information stored as the CEC communication information 214. The hypothetical table 300 is organized for purposes of clarity into a series of columns. Column 302 describes characteristics of a particular electronic device function. Column 304 identifies the origination HDMI/CEC device that transmitted the CEC communication onto the CEC bus. Column 306 identifies the destination HDMI/CEC device that receives the CEC communication detected on the CEC bus. Column 308 indicates whether a state change is to be implemented by the electronic device 102 in response to detecting the CEC communication between the originating and destination CEC-enabled electronic devices 106a-106n, and based on the characteristics of the detected CEC communication itself. Column 310 identifies a state that the electronic device 102 should transition to.

The information stored in the CEC communication information 214 may vary depending upon the embodiment. In some embodiments, one or more of the information categories conceptually illustrated in the information columns 302, 304, 306, 308 and/or 310 may be omitted. In other embodiments, additional information may be included in the CEC communication information 214.

For example, information identifying only one of the originating or destination CEC-enabled electronic devices 106a-106n may be used. For example, the originating one of the electronic devices 106a-106n may not be needed to determine a characteristic of the CEC communications, such as when the electronic device 102 is a DVD player and the destination CEC-enabled electronic device 106 is a television. That is, if the TV 106 is receiving certain types of CEC communications, embodiments of the CEC communications monitoring unit 120 may ascertain characteristics of the CEC communications that are directed to the TV 106, and then make decisions regarding the state of the electronic device 102.

As another example, some embodiments may omit the state change column and simply specify a state condition in the state column 310 that the electronic device 102 is to transition to. For example, if the destination CEC-enabled electronic device 106 is a TV is receiving certain kinds of CEC communications such as a channel change or a power on command, embodiments of the CEC communications monitoring unit 120 may cause the electronic device 102 to transition to a full power state. When the TV is receiving other kinds of CEC communications, embodiments of the CEC communications monitoring unit 120 may cause the electronic device 102 to transition to a standby state or remain in its current state.

To conceptually describe operation of an embodiment of the electronic device 102 provisioned with an embodiment of the CEC communications monitoring unit 120, several non-limiting examples describing hypothetical operation using the information in the example table 300 are provided. With respect to the first row 312 of table 300, the CEC-enabled electronic device 106a is the originating device of a power on instruction that is communicated to the destination CEC-enabled electronic device 106b. Here, the "power on" instruction tends to indicate the presence of a user that is getting ready to operate the destination CEC-enabled electronic device 106b. In this example, the electronic device 102 will perform a state change, as indicated by the "YES" in column 308. In the example embodiment, the electronic device 102 will go to the standby operating state. The state change made by the electronic device 102 is made in anticipation that the user may want to operate the electronic device 102 in the near future. In another embodiment, wherein column 310 is not included in the table 300, the electronic device 102 may simply transition from its current state to a higher state of readiness.

With respect to the row 314 of table 300, the CEC-enabled electronic device 106a is the originating device of a power on instruction that is communicated to the destination CEC-enabled electronic device 106n. Here, the "power on" instruction tends to indicate the presence of the user that is getting ready to operate the destination CEC-enabled electronic device 106n. However, in this example, the electronic device 102 will not perform a state change, as indicated by the "NO" in column 308. The decision to not change the current state of the electronic device 102 is made in anticipation that the user will likely not want to operate the electronic device 102 in the near future. In the example embodiment, the electronic device 102 will go to and/or remain in the deep sleep state. In another embodiment, wherein column 308 is not included in the table 300, the electronic device 102 may simply transition from its current state to the deep sleep state. In another embodiment, wherein column 310 is not included in the table 300, the electronic device 102 may simply remain in its current state. For example, the CEC-enabled electronic device 106n may be a game playing device. If the electronic device 102 is a DVD player, it is not likely that the user will want to operate the DVD player to play a movie while concurrently playing a game on the CEC-enabled electronic device 106n. Accordingly, the DVD player may be directed to go into, or remain in, a deep sleep state until the user stops playing games on their game playing device.

With respect to the row 316 of table 300, the CEC-enabled electronic device 106a is the originating device of a routine ping or query that is communicated to any one of, or all of, the CEC-enabled electronic devices 106a-106n. Here, the routine ping or query tends to indicate the presence of the user since such pings or queries, or responses to pings or queries (referred to herein as a type of acknowledgement CEC communication), are typically transmitted during device operation. Accordingly, in this example, the electronic device 102 will perform a state change, as indicated by the "YES" in column 308. The decision to change the current state of the electronic device 102 is made in anticipation that the user may potentially want to operate the electronic device 102 in the near future. Accordingly, in this example embodiment, the electronic device 102 will transition into its standby operating state, a fully powered state, or at least transition from its current state to a higher state of readiness.

In another example embodiment, a routine ping or query, or a response to the ping or query (also referred to herein as a type of acknowledgement CEC communication), may tend to indicate that the user is not likely to use the electronic device 102, and/or may indicate an absence of the user. For example, the device issuing the ping or query may be located remotely from the electronic device 102 (such as a television in the user's upstairs bedroom), and therefore, indicate a likelihood that the user will not be operating the electronic device 102 (such as a DVD player located in the downstairs media room). Accordingly, in this example, the electronic device 102 will not perform a state change, and would be indicated by a "NO" in the column 308. Here, the decision to change the current state of the electronic device 102 is made in anticipation that the user may potentially want to operate the electronic device 102 in the near future. For example, the electronic device 102 may transition into, or remain in, the deep sleep state. Alternatively, the electronic device 102 may transition into a state of lower readiness.

With respect to the row 318 of table 300, the CEC-enabled electronic device 106b is the originating device of a volume down acknowledgement (VOL DOWN ACK.), referred to herein as a type of acknowledgement CEC communication, that is communicated to the CEC-enabled electronic device 106a. Here, the volume down acknowledgement may be sent to the CEC-enabled electronic device 106a to acknowledge receipt of a previously communicated CEC communication to increase volume. The volume down acknowledgement communication tends to indicate that the user is present and is currently operating selected ones of the CEC-enabled electronic devices 106a-106n. Accordingly, in this example, the electronic device 102 will perform a state change, as indicated by the "YES" in column 308. In one situation, the electronic device 102 transitions to the standby state in anticipation that the user may want to operate the electronic device 102 in the near future. In another situation, the electronic device 102 may transition from a fully operational state to the standby state in anticipation that the user may not want to operate the electronic device 102 in the near future. For example, the CEC-enabled electronic device 106a may be a TV. If the electronic device 102 is a DVD player, it is possible that the user will want to operate the DVD player to play a movie at some future point in time.

With respect to the row 320 of table 300, the CEC-enabled electronic device 106b is the originating device of a channel up acknowledgement (CH UP ACK), also referred to herein as a type of acknowledgement CEC communication, that is communicated to the CEC-enabled electronic device 106n. Here, the channel up acknowledgement may be sent to the CEC-enabled electronic device 106n to acknowledge receipt of a previously communicated CEC communication to upwardly increment the currently presented channel. The channel up acknowledgement communication tends to indicate that the user is present and is currently operating selected ones of the CEC-enabled electronic devices 106a-106n. Accordingly, in this example, the electronic device 102 will perform a state change, as indicated by the "YES" in column 308. In one situation, the electronic device 102 transitions to the full power state in anticipation that the user may want to operate the electronic device 102 in the near future.

The above-described simplified examples are merely illustrations of possible decisions to change operating states, or not to change operating states, that might be made by an embodiment of the electronic device 102 based on the kinds of detected CEC communications. The information contained in the table may be quite voluminous and contain many other types of state control operations, as indicated by the row 322.

In some embodiments, the information residing in the table 300 is predefined. The table 300 may be initially populated by the original equipment manufacturer (OEM) prior to releasing the newly manufactured electronic device 102. Alternatively, or additionally, the table 300 may be later populated. For example, the electronic device 102 may be connected to the internet and information populating the table 300 may be accessed from a remote internet site. Or, information may be provided from a memory medium that is later communicatively coupled to the electronic device 102. Additionally, or alternatively, the information populating the table 300 may be specified by a user or another individual, such as a service technician.

Alternatively, or additionally, the information residing in the table 300 may be learned. That is, based on prior use of the various electronic devices 106a-106n and the electronic device 102, the CEC communication monitoring unit 120 may learn which particular operating states are appropriate for the various kinds of detected CEC communications. Any suitable learning algorithm or logic may be used. The learning algorithm or logic may be incorporated into the CEC information logic 212, or may reside separately in another memory medium. The learning functionality, in some embodiments, may be later downloaded into the electronic device 102 and/or the CEC communication monitoring unit 120 to supplement the information in the table 300.

Figure 4:
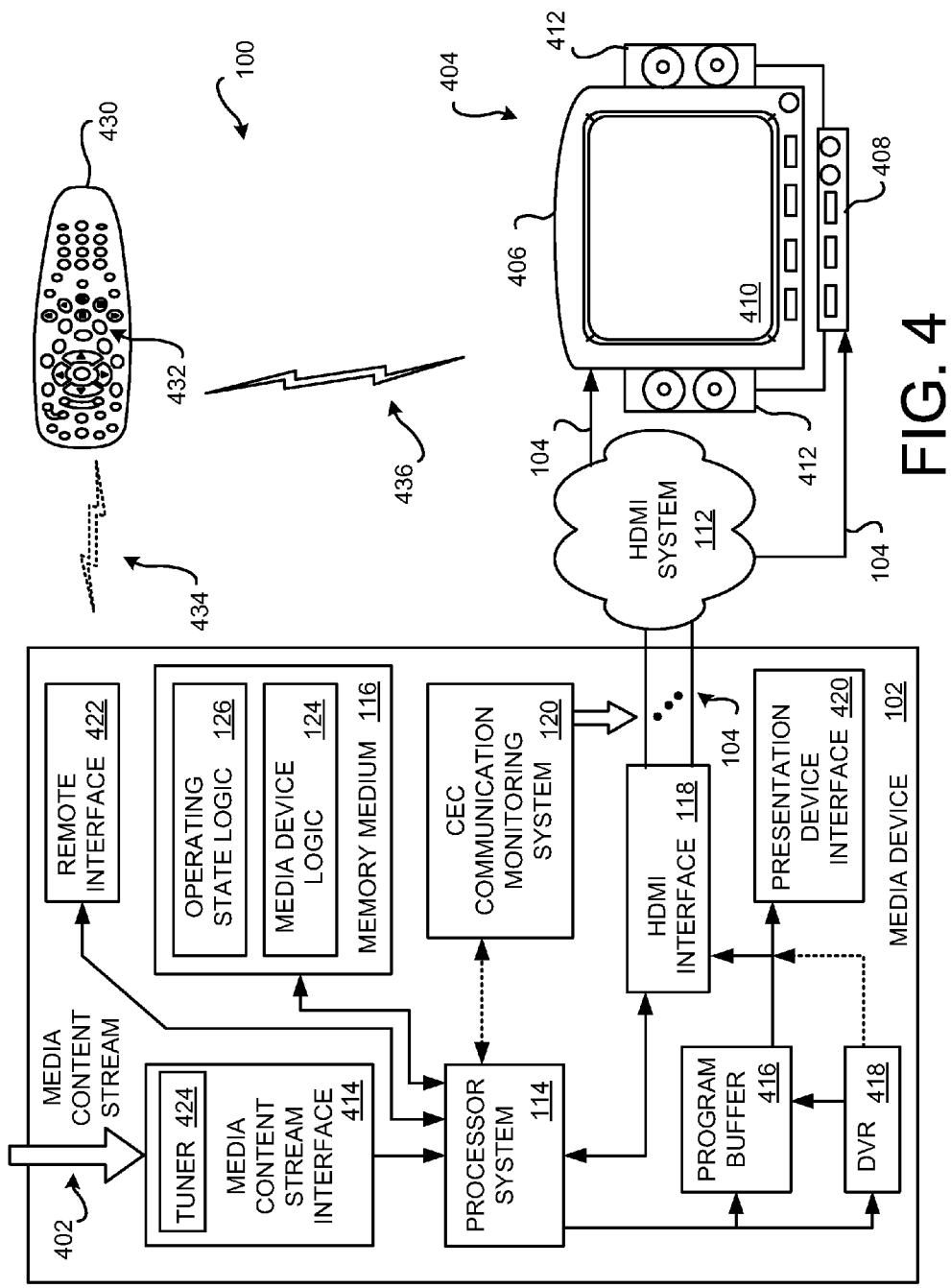
FIG. 4 is a block diagram of an embodiment of the CEC communications monitoring unit implemented in an example set top box (STB).

FIG. 4 is a block diagram of an embodiment of the CEC communications monitoring unit 120 implemented in an example media device. Embodiments of the CEC communication monitoring unit 120 may be implemented in media devices, such as, but not limited to, set top boxes (STBs), stereos, surround-sound receivers, radios, televisions (TVs), digital video disc (DVD) players, digital video recorders (DVRs), game playing devices, or personal computers (PCs) that are configured to present a video-based media content event that is received in a media content stream 402

The exemplary media device 102 is communicatively coupled to a media presentation system 404 comprising one or more media presentation devices. Example media presentation devices include, but are not limited to, a visual display device 406, such as a television (hereafter, generically a TV), and an audio presentation device 408, such as a surround-sound receiver (hereafter, generically, a speaker). Other types of output devices may also be coupled to the media device 102, including those providing any sort of stimuli sensible by a human being, such as temperature, vibration and the like. The video portion of the media content event is displayed on the display 410 and the audio portion of the media content event is reproduced as sounds by one or more speakers 412. In some embodiments, the media device 102 and one or more of the components of the media presentation system 106 may be integrated into a single electronic device.

The non-limiting exemplary media device 102 comprises a media content stream interface 414, a processor system 114, a memory medium 116, a program buffer 416, an optional digital video recorder (DVR) 418, an optional presentation device interface 420, a remote interface 422, the HDMI interface 118, and the CEC communication monitoring system 120. The memory medium 116 comprises portions for storing the media device logic 124 and the operating state logic 126. In some embodiments, the media device logic 124 and the operating state logic 126 may be integrated together, and/or may be integrated with other logic. In other embodiments, some or all of these memory and other data manipulation functions may be provided by and using remote server or other electronic devices suitably connected via the Internet or otherwise to a client device. Other media devices 102 may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 402 multiplexed together in one or more transport channels. The transport channels with the media content streams 402 are communicated to the media device 102 from a media broadcast system sourced from a remote head end facility (not shown) operated by the media content provider. Non-limiting examples of such media systems include satellite systems, a cable system, and the Internet. For example, if the media content provider provides programming via a satellite-based communication system, the media device 102 is configured to receive one or more broadcasted satellite signals detected by an antenna (not shown). Alternatively, or additionally, the media content stream 402 can be received from one or more different sources, such as, but not limited to, a cable system, a radio frequency (RF) communication system, or the Internet.

The one or more media content streams 402 are received by the media content stream interface 414. One or more tuners 424 in the media content stream interface 414 selectively tune to one of the media content streams 402 in accordance with instructions received from the processor system 114. The processor system 114, executing the media device logic 124 and based upon a request for a media content event of interest specified by a user, parses out media content associated with the media content event of interest. The media content event of interest is then assembled into a stream of video and/or audio information which may be stored by the program buffer 416 such that the media content can be streamed out to components of the media presentation system 404, such as the visual display device 406 and/or the audio presentation device 408, via the HDMI interface 118. The HDMI interface 118 communicatively couples the media device 102 to the visual display device 406 and/or the audio presentation device 408 via an HDMI connector 104. The visual display device 406 and/or the audio presentation device 408 may be CEC enabled. Alternatively, the stream of video and/or audio information may be streamed out to the visual display device 406 and/or the audio presentation device 408 via the presentation device interface 420.

Alternatively, or additionally, the parsed out media content may be saved into the DVR 418 for later presentation. The DVR 418 may be directly provided in, locally connected to, or remotely connected to, the media device 102.

The exemplary media device 102 is configured to receive commands from a user via a remote control 430. The remote control 430 includes one or more controllers 432. The user, by actuating one or more of the controllers 432, causes the remote control 430 to generate and transmit commands, via a wireless signal 434, to the media device 102. The commands control the media device 102 and/or control the media presentation devices 404. The wireless signal 434 may be an infrared (IR) signal or a radio frequency (RF) signal that is detectable by the remote interface 422.

The processes performed by the media device 102 relating to the processing of the received media content stream 402 and communication of a presentable media content event to the components of the media presentation system 404 are generally implemented by the processor system 114 while executing the media device logic 124. Thus, the media device 102 may perform a variety of functions related to the processing and presentation of one or more media content events received in the media content stream 402.

At times, the user (not shown) may view and listen to various media content when presented on the exemplary visual display device 406 (television) and/or the exemplary audio presentation device 408 (surround sound receiver) at times when the media device 102 is in a deep sleep state or a standby state. In such situations, user commands may be generated at and transmitted from the remote control 430 as a wireless signal 436 that is received directly by the television, the visual display device 406 and/or the audio presentation device 408 can then directly control. However, such commands generated by the remote control 430 may be also communicated onto the respective HDMI connectors 104 as CEC communications. Accordingly, the CEC communications may be detected by the CEC communication monitoring unit 120 such that the media device may change its operating state. For example, the user may turn on the audio presentation device 408 to listen to a compact disc (CD). If the media device 102 is in a deep sleep state, upon detection of the turn on command that is communicated as a CEC communications, the media device 102 may transition into a standby state or a fully operational state.

It should be emphasized that the above-described embodiments of the CEC communications monitoring system 100 are merely possible examples of implementations of the invention. Many variations and modifications may be made to the above-described embodiments. All such modifications and variations are intended to be included herein within the scope of this disclosure and protected by the following claims.

The invention claimed is:
1. A method, comprising:
   detecting, at a first electronic device, a consumer electronic control (CEC) communication sent from a second electronic device to a third electronic device,
      wherein the CEC communication includes a destination address that is the same as an address of the third electronic device,
      wherein the CEC communication does not include an address of the first electronic device; and
      wherein the CEC communication is communicated over high-definition multimedia (HDMI) connectors communicatively coupling the first electronic device, the second electronic device and the third electronic device;
   determining, at the first electronic device and based on information in the CEC communication, whether the CEC communication is one of a first kind of CEC communication or a second kind of CEC communication,
      wherein the determining is made at the first electronic device when the destination address of the third electronic device is included in the CEC communication and when the address of the first electronic device is not included in the CEC communication,
      wherein the first kind of CEC communication is associated with use of the second electronic device or the third electronic device of a user, and
      wherein the second kind of CEC communication is not associated with use of the second electronic device or the third electronic device by the user;
   in response to determining at the first electronic device that the CEC communication is one of the first kind of CEC communication, transitioning the first electronic device to a predefined operating state; and
   in response to determining at the first electronic device that the CEC communication is one of the second kind of CEC communication, maintaining the first electronic device in a current operating state.

2. The method of claim 1, where in response to determining that the CEC communication is the first kind of CEC communication, the method further comprising:
   communicating information from a first processor system residing in the first electronic device to a second processor system residing in the first electronic device,
   wherein the first processor is processing the detected CEC communication to determine whether the CEC communication is one of the first kind of CEC communication or the second kind of CEC communication, and
   wherein the information communicated from the first processor system to the second processor system causes the second processor system to transition the first electronic device to the predefined operating state.

3. The method of claim 2, where in response to determining that the CEC communication is the second kind of CEC communication, the method further comprising:
   refraining from communicating the information from the first processor system to the second processor system,
   wherein the second processor system maintains the first electronic device in the current operating state.

4. The method of claim 1, wherein the predefined operating state is a deep sleep state wherein one or more of the components of the first electronic device are not powered and are not ready for immediate operation, the transitioning to the predefined operating state comprising:
   transitioning from the deep sleep state to a standby state wherein one or more of the components of the first electronic device are fully powered and ready for immediate operation, and wherein at least one other of the components of the first electronic device are not ready for immediate operation.

5. The method of claim 1, wherein the predefined operating state is a deep sleep state wherein one or more of the components of the first electronic device are not powered and are not ready for immediate operation, the transitioning to the predefined operating state comprising:
  transitioning from the deep sleep state to a fully operational state wherein the first electronic device is fully operational for its intended function.

6. The method of claim 1, wherein the predefined operating state is a standby state wherein one or more of the components of the first electronic device are fully powered and ready for immediate operation, and wherein at least one other of the components of the first electronic device are not ready for immediate operation, the transitioning to the predefined operating state comprising:
  transitioning from the standby state to a fully operational state wherein the first electronic device is fully operational for its intended function.

7. The method of claim 1, wherein detecting, at the first electronic device, the CEC communication sent from the second electronic device to the third electronic device further comprises:
  detecting the CEC communication on a CEC bus of a HDMI connector coupled to the first electronic device.

8. The method of claim 1, wherein determining whether the CEC communication is the first kind of CEC communication or the second kind of CEC communication comprises:
  determining that the detected CEC communication is associated with a routine maintenance command that controls operation of the third electronic device,
  wherein the detected CEC communication is determined to be the second kind of CEC communication when the detected CEC communication is associated with the routine maintenance command.

9. The method of claim 1, wherein determining whether the CEC communication is the first kind of CEC communication or the second kind of CEC communication comprises:
  determining that the detected CEC communication is associated with a user command that controls operation of the third electronic device,
  wherein the detected CEC communication is determined to be the first kind of CEC communication when the detected CEC communication is associated with the user command.

10. The method of claim 1, wherein determining whether the CEC communication is the first kind of CEC communication or the second kind of CEC communication comprises:
  determining that the detected CEC communication is an acknowledgement CEC communication communicated in response to receiving a prior CEC communication by the second electronic device from the third electronic device, and determining that the prior CEC communication is associated with a user command that controls operation of the second electronic device,
  wherein the detected acknowledgement CEC communication is determined to be the first kind of CEC communication when the detected acknowledgement CEC communication is associated with the user command.

11. The method of claim 1, where in response to determining that the CEC communication is the first kind of CEC communication, the method further comprising:
  communicating information from the first electronic device to a fourth electronic device, wherein the fourth electronic device transitions to at least one of a standby state and a fully operational state in response to receiving the communicated information from the first electronic device.

12. The method of claim 1, wherein determining whether the CEC communication is the first kind of CEC communication or the second kind of CEC communication comprises:
  determining an identity of the second electronic device, wherein the detected CEC communication includes an originating device address identifying the second electronic device,
  wherein the detected CEC communication is determined to be the first kind of CEC communication based on the identity of the second electronic device.

13. The method of claim 1, wherein determining whether the CEC communication is the first kind of CEC communication or the second kind of CEC communication comprises:
  determining an identity of the third electronic device, wherein the detected CEC communication includes a destination device address identifying the third electronic device,
  wherein the detected CEC communication is determined to be the first kind of CEC communication based on the identity of the third electronic device.

14. A first electronic device, comprising:
  a high-definition multimedia (HDMI) interface communicatively coupling the first electronic device to at least one HDMI connector that includes a consumer electronic control (CEC) bus,
    wherein a CEC communication sent from a second electronic device to a third electronic device is received at the first electronic device via the HDMI connector,
    wherein the CEC communication includes a destination address that identifies the third electronic device as being intended to receive the CEC communication, and
    wherein the CEC communication does not include an address of the first electronic device;
  a memory that stores operating state logic that operates the first electronic device in at least one of a first operating state and a second operating state; and
  a processor system communicatively coupled to the HDMI interface and the memory, wherein the processor system of the first electronic device is configured to:
    determine based on information in the CEC communication, whether the CEC communication is one of a first kind of CEC communication or a second kind of CEC communication, wherein the determining is made when the destination address of the third electronic device is included in the CEC communication and when the address of the first electronic device is not included in the CEC communication,
  wherein the processor, in response to determining that the CEC communication is one of the first kind of CEC communication, transitions is further configured to transition the first electronic device from the first operating state to the second operating state based upon the operating state logic retrieved from the memory, and
  wherein the processor, in response to determining that the CEC communication is one of the second kind of CEC communication, is further configured to maintain the first electronic device in the first operating state based upon the operating state logic retrieved from the memory.

15. The first electronic device of claim 14, wherein the HDMI connector coupled to the first electronic device is a first HDMI connector, and further comprising:

a HDMI system that comprises the first HDMI connector coupled to the first electronic device, a second HDMI connector coupled to the second electronic device, and a third HDMI connector coupled to the third electronic device.

16. The first electronic device of claim 14, further comprising:
   a non-HDMI device interface communicatively coupled to the processor system and configured to communicatively couple the first electronic device to a non-HDMI enabled electronic device,
   wherein the processor system communicates information to the non-HDMI enabled electronic device in response to determining that the CEC communication is one of the first kind of CEC communication, and
   wherein the communicated information causes the non-HDMI enabled electronic device to transition from a deep sleep state to at least one of a standby state and a fully operational state.

17. The first electronic device of claim 14, further comprising:
   a CEC communication monitoring system that monitors CEC communications that are communicated on the HDMI connector, and that determines that the CEC communication is the first kind of CEC communication or the second kind of CEC communication,
   wherein the CEC communication monitoring system communicates information to the processor system in response to determining that the CEC communication is the first kind of CEC communication, wherein the communicated information causes the processor system to transition the first electronic device from the first operating state to the second operating state, and
   wherein the CEC communication monitoring system refrains from communicating the information to the processor system so that the processor system maintains the first electronic device in the first operating state.

18. The first electronic device of claim 17, wherein the processor system is a first processor system, and wherein the CEC communication monitoring system comprises:
   a second processor system;
   a power interface that provides power for operation of at least the second processor system;
   a monitoring system HDMI interface that monitors CEC communications that are communicated on the HDMI connector; and
   a processor system interface that communicatively couples the first processor system and the second processor system,
   wherein the second processor system generates the information that is communicated to the first processor system via the processor system interface.

19. A method, comprising:
   transitioning a first electronic device into a deep sleep state of operation, wherein one or more of the components of the first electronic device are not powered and are not ready for immediate operation;
   monitoring, at the first electronic device, a consumer electronic control (CEC) communication sent from a second electronic device to a third electronic device,
      wherein the CEC communication is communicated over high-definition multimedia (HDMI) connectors communicatively coupling the first electronic device, the second electronic device and the third electronic device,
      wherein the CEC communication includes a destination address that is an address of the third electronic device, and
      wherein the CEC communication does not include an address of the first electronic device; and
   determining, at the first electronic device and based on information in the CEC communication, whether the CEC communication is one of a first kind of CEC communication or a second kind of CEC communication, wherein the determining is made at the first electronic device when the destination address of the third electronic device is included in the CEC communication and when the address of the first electronic device is not included in the CEC communication;
   in response to determining that the CEC communication is the first kind of CEC communication, transitioning the first electronic device from the deep sleep state to at least one of a standby state and a fully operational state; and
   in response to determining that the CEC communication is the second kind of CEC communication, maintaining the first electronic device in the deep sleep state.

20. The method of claim 19, wherein the transition into the deep sleep state is controlled by a first processor residing in the first electronic device, and wherein determining that the CEC communication is the first kind of CEC communication or the second kind of CEC communication is determined by a second processor residing in the first electronic device, and further comprising:
   communicating information from the second processor system to the first processor system when the CEC communication is the first kind of CEC communication,
   wherein the information communicated from the second processor system to the first processor system causes the second processor system to transition the first electronic device from the deep sleep state.

* * * * *